(12) United States Patent
Greif et al.

(10) Patent No.: US 9,931,700 B2
(45) Date of Patent: Apr. 3, 2018

(54) CLAMPING DEVICE

(71) Applicant: Ott-Jakob Spanntechnik GmbH, Lengenwang (DE)

(72) Inventors: Josef Greif, Friesenried (DE); Peter Mohr, Wiggensbach (DE); Bartholomäus Reisacher, Jr., Buchloe (DE)

(73) Assignee: OTT-JAKOB SPANNTECHNIK GMBH, Lengenwang (DE)

( * ) Notice: Subject to any disclaimer, the term of this patent is extended or adjusted under 35 U.S.C. 154(b) by 21 days.

(21) Appl. No.: 15/335,673

(22) Filed: Oct. 27, 2016

(65) Prior Publication Data

US 2017/0129019 A1    May 11, 2017

(30) Foreign Application Priority Data

Nov. 6, 2015    (DE) .......................... 10 2015 119 061

(51) Int. Cl.
*B23B 31/26*    (2006.01)
*B23Q 3/12*    (2006.01)

(52) U.S. Cl.
CPC ............ *B23B 31/265* (2013.01); *B23B 31/26* (2013.01); *B23B 2260/034* (2013.01); *B23B 2260/12* (2013.01); *B23B 2260/136* (2013.01)

(58) Field of Classification Search
CPC ..... B23B 31/26; B23B 31/261; B23B 31/263; B23B 31/265; B23B 2260/034; B23C 5/26
See application file for complete search history.

(56) References Cited

U.S. PATENT DOCUMENTS 4,790,700 A * 12/1988 Schwartzman ....... B23B 31/207
                                                    267/181
7,320,567 B2    1/2008 Greif et al.
7,393,165 B2    7/2008 Greif et al.

FOREIGN PATENT DOCUMENTS

| DE | 10 2004 051 031 | | 4/2006 | |
|---|---|---|---|---|
| DE | 102006052309 A1 | * | 5/2007 | .......... B23B 31/261 |
| DE | 102014117571 B3 | * | 2/2016 | .......... B23B 31/261 |
| JP | 01146602 A | * | 6/1989 | .......... B23B 31/265 |
| JP | 03121709 A | * | 5/1991 | |
| JP | 10118815 A | * | 5/1998 | |
| JP | 2001269803 A | * | 10/2001 | |

(Continued)

OTHER PUBLICATIONS

Proquest machine translation of JP 10-118815, printed Dec. 2017.*

*Primary Examiner* — Daniel Howell
(74) *Attorney, Agent, or Firm* — Paul D. Bianco; Gary Winer; Fleit Gibbons Gutman Bongini & Bianco PL

(57) ABSTRACT

A clamping device for clamping a workpiece or a tool or a tool holder to a machine component of a machine tool, including an axially movable tension rod, a clamping assembly which can be moved by the tension rod between a clamped position and a released position, a spring assembly dedicated to the tension rod for generating the clamping and draw-in force of the clamping assembly, and a releasing unit by which the clamping assembly can be moved by the tension rod against the force of the spring assembly into the released position. The spring assembly has a minimum of one spring unit with a plurality of flexible spring members disposed between a first and a second spring holder, with the first and second spring holders being secured against torsion relative to the tension rod.

14 Claims, 5 Drawing Sheets

(56) References Cited

FOREIGN PATENT DOCUMENTS

| JP | 2002018610 A | * | 1/2002 |
| JP | 2003220504 A | * | 8/2003 |
| JP | 2007296636 A | * | 11/2007 |

* cited by examiner

Fig. 4
Fig. 5
Fig. 6
Fig. 7
Fig. 8
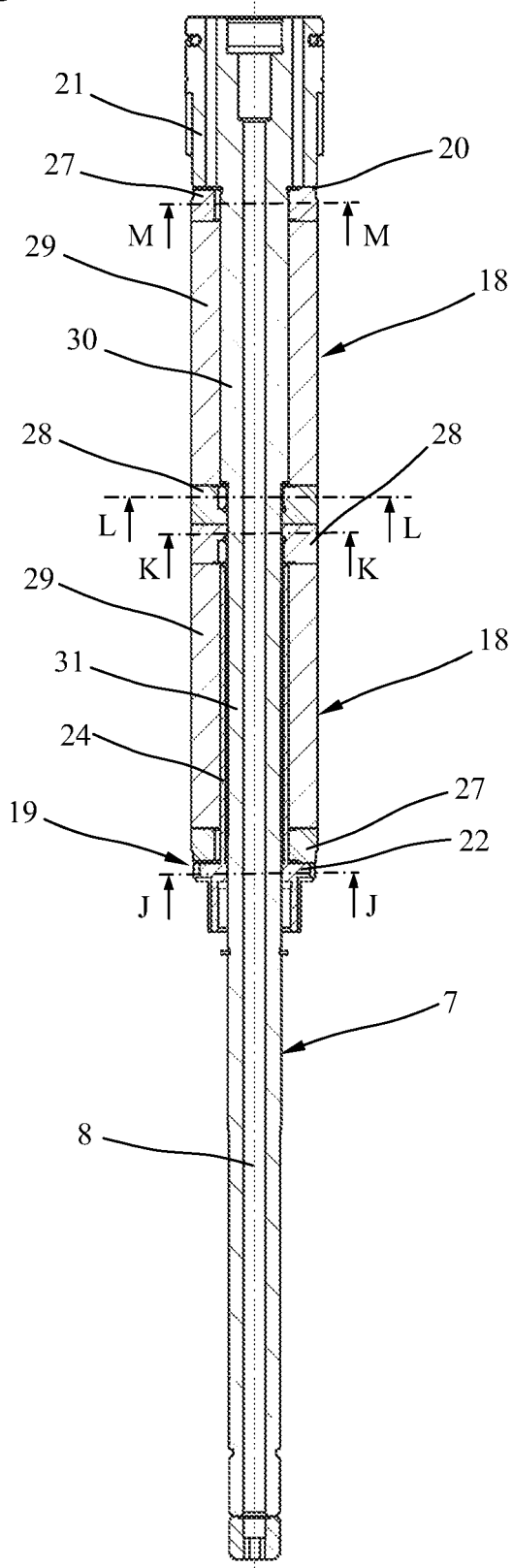
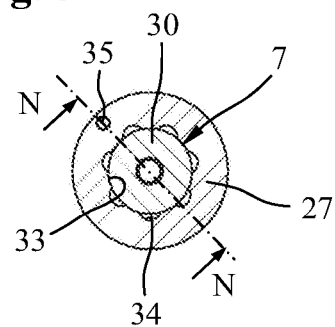
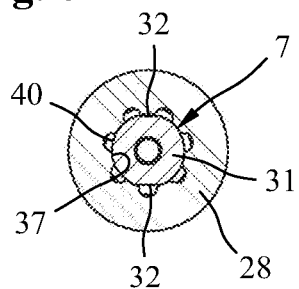
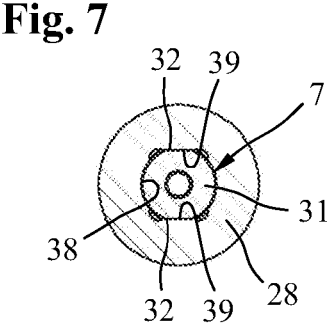
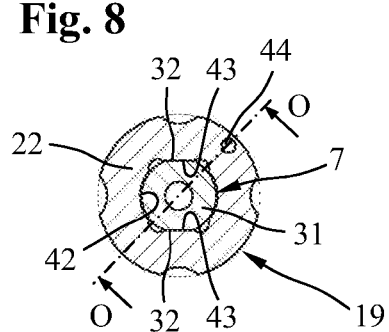

CLAMPING DEVICE

FIELD OF THE DISCLOSURE

The present disclosure relates to a clamping device for clamping a workpiece or a tool or a toolholder to a machine component of a machine tool. In addition, the present disclosure also relates to a machining unit of a machine tool having this type of clamping device.

BACKGROUND

As a rule, machine tools or machining centers comprise a clamping device that is integrated into their work spindle for automatically clamping and releasing machining tools. In the clamping devices known in the art, the machining tools are held by a clamping assembly which is disposed in the work spindle on the forward end of a tension rod that is biased by a spring assembly. As a rule, the clamping assembly comprises a plurality of radially movable pincer members by means of which the machining tool is drawn into the work spindle. To release the machining tools, the tension rod is moved against the force of the spring assembly using a so-called releasing unit so that the clamping assembly with the pincer members is opened and releases the machining tool.

A clamping device of this type is known from DE 10 2004 051 031 B3. In this clamping device, the spring assembly is configured in the form of a cup spring pack with a plurality of cup springs disposed adjacent to one another. However, cup spring packs of this type have a relatively high weight and, in addition, because of the high loads to which they are subjected, only a limited service life. In addition, the installation of such cup spring packs is associated with a considerable expenditure of labor.

SUMMARY

A clamping device and a machining unit with this type of clamping device are disclosed in which the spring assembly used to generate the clamping or draw-in force is configured so as to be compact and easy to install.

Useful advanced embodiments and advantageous modifications are also disclosed.

In an embodiment of the clamping device according to the present disclosure, the spring assembly used to generate the clamping and draw-in force of the clamping assembly comprises a minimum of one spring unit with a plurality of flexible spring members disposed between a first and a second spring holder, said first and second spring holders being secured against torsion relative to the tension rod. The spring unit with the individual spring members and the associated spring holders can be prefabricated as a compact single-piece unit and is easy to install. As a single-piece unit, it can be easily placed onto the tension rod, thereby considerably simplifying the installation and potential deinstallation.

According to a useful embodiment of the disclosure, the spring unit can be configured as a buckling column spring with a plurality of bar-shaped spring members spaced apart in the circumferential direction and with their ends being rigidly mounted or hinge-mounted in the spring holders. The bar-shaped spring members can be made of metal or a fiber-reinforced composite.

In another useful embodiment, the spring assembly comprises a plurality of series-connected spring units which are also secured against torsion relative to one another. By suitably selecting or combining a plurality of spring units, the desired spring characteristics can be readily changed and adapted to any prevailing requirements.

A torsion-proof connection between the spring unit and the tension rod can be achieved, e.g., in that the first spring holder comprises a locking member, e.g., in the form of a locking pin. The locking member disposed on the first spring holder, e.g., can engage in form-fitting fashion in the tension rod or in a contact-making member disposed in a torsion-proof manner on the tension rod. The locking member configured in the form of a pin or the like can be disposed in a bore on the front side of the first spring holder. The second spring holder can have an inside contour so as to engage in form-fitting fashion in a matching outside contour of the tension rod. In a possible embodiment, the inside contour on the second spring holder can be formed by a passage with two parallel surfaces, and the corresponding outside contour can be formed by flattened surfaces on the narrower forward section of the tension rod. Other matching contours for a form-fitting connection are possible as well.

To avoid a non-uniform compression of a plurality of spring units disposed one behind the other, the axial displacement of a minimum of one spring holder relative to the tension rod during the compression of the minimum of one spring unit can be limited by a stop. The stop can be formed, e.g., by a stop face of a sleeve-shaped contact-making section on a contact-making member disposed on the tension rod so as to be secured against torsion and/or by a stop face on a middle section of the tension rod. In this manner, it can be ensured that not only one of the spring units will be compressed.

The releasing unit, by means of which the clamping assembly can be moved into the release position against the force of the spring assembly, can be operated hydraulically, pneumatically or electrically. When operated electrically, separate hydraulic and pneumatic aggregates as well as technically complex sealing measures are not necessary. The electric drive can be a motor, the stator and rotor of which are accommodated in a housing of the releasing unit.

Also disclosed is a machining unit of a machine tool in which the above-described clamping device is integrated into a work spindle or into another machine component.

The machine component is preferably a pivotably mounted work spindle which is rotationally driven by a drive mechanism.

BRIEF DESCRIPTION OF THE DRAWINGS

Additional features and advantages of the present disclosure follow from the subsequent description of a preferred embodiment example with reference to the drawing. The drawings show:

FIG. 4 a longitudinal section through a tension rod with two spring units;

FIG. 5 a cross section along line M-M of FIG. 4;

FIG. 6 a cross section along line L-L of FIG. 4;

FIG. 7 a cross section along line K-K of FIG. 4;

FIG. 8 a cross section along line J-J of FIG. 4;

DETAILED DESCRIPTION

Figure 1:
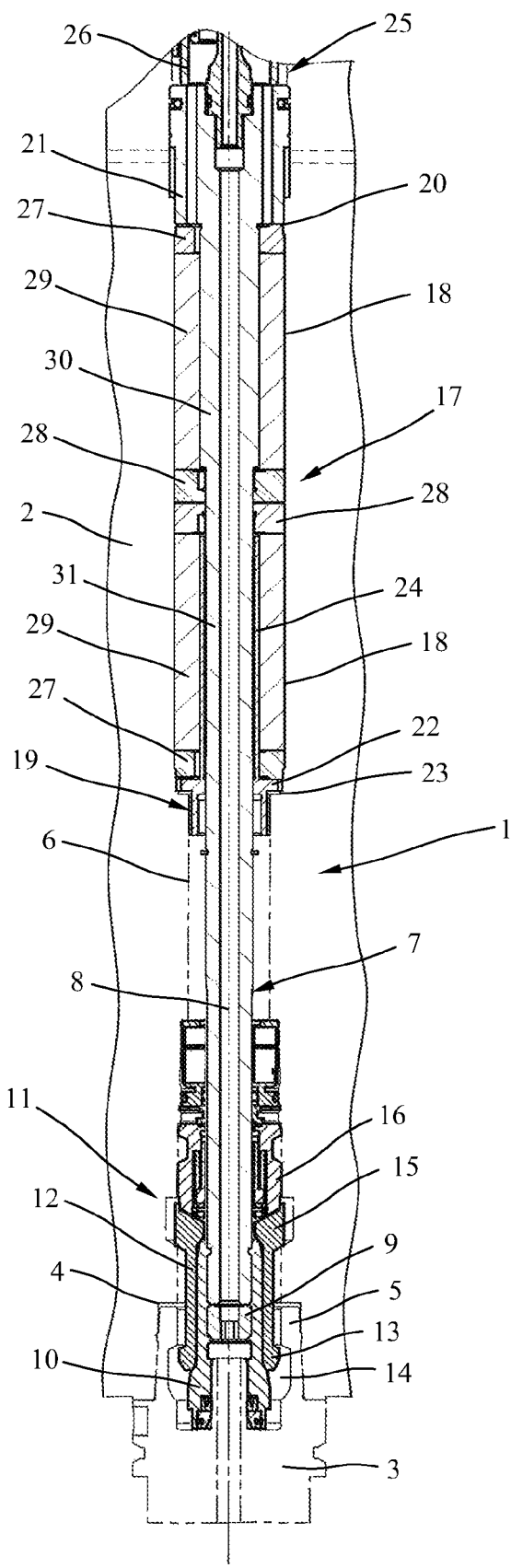
FIG. 1 a longitudinal section through a machining unit of a machine tool comprising a clamping device.

FIG. 1 shows a schematic representation of a machining unit of a machine tool with a clamping device 1 integrated into a machine component 2 for clamping a workpiece or a tool or a toolholder 3. In the embodiment shown, the machine component 2, which is only partially sketched in, is a work spindle 1 which is pivotably mounted inside a spindle housing and rotationally driven by a drive mechanism and which, on its outer end as seen at the bottom of FIG. 1, comprises an inside taper 4 for receiving a machine taper 5 of the toolholder 3, here in the form of a hollow taper shank, or a milling cutter, a drill bit or another machining tool. Using the clamping device 1, it is also possible to clamp in a workpiece that is rotating during the machining operation. The machine component 2 can also be a machining table or the like into which the clamping device 1 for clamping a workpiece or a tool is integrated.

The clamping device 1 comprises a tension rod 7 which is axially movable within a through-passage 6 of the machine component 2 and which, in the embodiment illustrated, has a through-bore 8 for feeding a coolant to the toolholder 3 or the tool. On the forward end 9 of the tension rod 7 facing the toolholder 3, a clamping cone 10 of a clamping assembly 11 as known in the art is mounted. The clamping assembly 11 comprises a collet having a plurality of pincer members 12 disposed around the clamping cone 10, which pincer members are radially movable for clamping or releasing the machine taper 5 by axially displacing the clamping cone 10.

The outer ends 13 of the pincer members 12 of the clamping assembly 11 engage in an annular groove 14 of the toolholder 3. The inner ends 15 of the pincer members 12 are supported by a supporting sleeve 16. The tension rod 7 is rearwardly biased by a spring assembly 17 concentrically disposed around said tension rod. On one side, the spring assembly 17, which in the embodiment illustrated comprises two spring units 18, which will be explained in greater detail below, is supported by a socket-shaped contact-making member 19 inside the machine component 2 and on the other side by a collar 20 on the wider rearward end 21 of the tension rod 7. The contact-making member 19 rests via an annular flange 22 against an inside annular ledge 23 of the through-passage 6 of the machine component 2, which in this case is a work spindle, and comprises a sleeve-shaped contact-making section 24 which extends in the direction of the rearward end 21 of the tension rod 7.

Disposed on the rearward end 21 of the tension rod 7 facing away from the toolholder 3 is a releasing unit 25, by means of which the tension rod 7 can be pushed forward, against the force of the spring assembly 17. The releasing unit 25 comprises a pressure sleeve 26 resting against the rearward end 21 of the tension rod 7, which pressure sleeve can be moved by means of a hydraulic, pneumatic or electric drive mechanism. When the tension rod 7 is pushed by means of the releasing unit 25 into the direction of the toolholder 3, the clamping assembly 11 disposed on the forward end of the work spindle 6 releases the machine taper 5 of the toolholder 3 or tool. In contrast, when the tension rod 7 is drawn rearward by the force of the spring assembly 17, the machine taper 5 is drawn and clamped into the machine component 2. The structure and functionality of the clamping assembly 11 are known in the art, thereby obviating the need for a detailed description.

Figure 2:
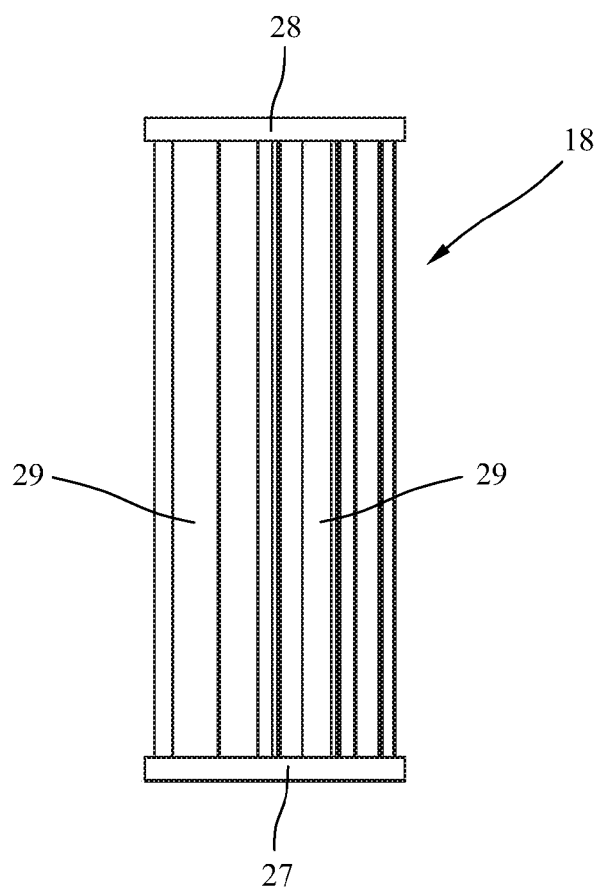
FIG. 2 a lateral view of a spring unit in an uncompressed state as used in the clamping device shown in FIG. 1.
Figure 3:
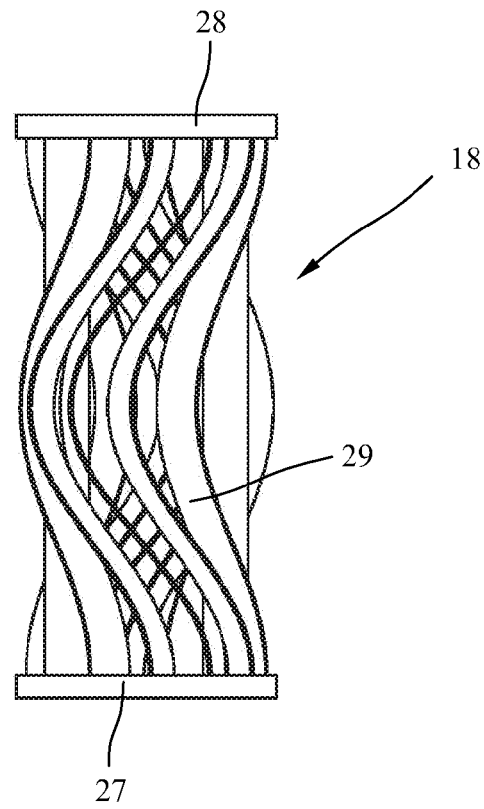
FIG. 3 a lateral view of the spring unit shown in FIG. 2 in a compressed state.

In the illustrated embodiment example, the spring assembly 17 comprises two series-connected spring units 18 which are separately shown in FIGS. 2 and 3, each of which comprises a plurality of spring members 29 disposed between two annular spring holders 27 and 28 and configured in the form of buckling columns. The bar-shaped spring members 29 can be made of metal, GFRP, CFRP or another fiber-reinforced composite and have a rectangular cross section. They can be disposed, e.g., in corresponding grooves on the front sides of the annular spring holders 27 and 28. When the spring unit 18 is compressed, the bar-shaped spring members 29 buckle with respect to the initial position shown in FIG. 2 and are bent as shown in FIG. 3. In the embodiment illustrated, the bar-shaped spring members 29 are spaced apart and angled in the circumferential direction in such a manner that the spring members 29 do not touch one another, even in the compressed state of the spring unit 18. The spring members 29 can be disposed radially or inclined at an angle relative to a connecting line between the center and the edge of the annular spring holder 27 or 28.

As FIGS. 4 to 8 indicate, the tension rod 7 has a cylindrical middle section 30 adjoining the collar 20 in the longitudinal direction on the rearward end 21 of the tension rod 7 and, adjoining said cylindrical middle section, a narrower forward section 31 with oppositely lying flattened surfaces 32. The outside diameter of the sleeve-shaped contact-making section 24 of the contact-making member 19 disposed on the narrower forward section 31 of the tension rod 7 conforms to the outside diameter of the middle section 30 of the tension rod 7. The design of the two spring units 18 is identical, and each of them comprises a first spring holder 27 and a differently designed second spring holder 28, with the rearward spring unit 18 disposed on the cylindrical middle section 30 of the tension rod 7 being rotated about its longitudinal axis by 180° relative to the rearward spring unit 18 disposed on the narrower forward section 31 of the tension rod 7, so that the two first spring holders 27 rest, respectively, against the collar 20 on the wider rearward end 21 of the tension rod 7 and on the annular flange 22 of the contact-making member 19 and the two second spring holders 28 are adjoiningly disposed in the middle of the spring assembly 17.

It can be seen in FIG. 5 that the first annular spring holder 27 has a through-passage 33 with an inside diameter that conforms to the outside diameter of the middle cylindrical section of the tension rod 7. Disposed on the inside wall of the through-passage 33 are a plurality of grooves 34 for the supply of blown air, which grooves are uniformly distributed across the circumference and extend in the longitudinal direction of the spring holder 27. In addition, on its front side, the first spring holder 27 also has a bore 35 for a locking member 36 shown in FIGS. 9 and 10 and here configured in the form of a locking pin.

As FIG. 4 and the cross sections of FIGS. 6 and 7 indicate, on the side facing the spring members 29, the second annular spring holder 28 has a passage 37 with a circular cross section extending through approximately half of the holder, and on its side facing the other spring holder 28, it has a passage 38 with two parallel surfaces 39 so as to rest against the flattened surfaces 32 on the narrower forward section 31 of the tension rod 7. As a result, the second spring holder 28 is disposed on the tension rod 7 so as to be axially movable and secured against torsion.

For routing the tension rod 7, the passage 37 of the second spring holder 28 shown in FIG. 6 has an inside diameter that is slightly larger than the outside diameter of the narrower forward section 31 of the tension rod 7. Here again, disposed on the inside wall of the passage 37 are a plurality of grooves 40 for the supply of blown air, which grooves are uniformly distributed across the circumference and extend in the longitudinal direction of the spring holder 28.

On the ends of the parallel surfaces 39 provided as a protection against torsion, the through-passage 38 of the second spring holder 28 shown in FIG. 7 also has inwardly curved grooves 41 for the supply of blown air. Because of the parallel surfaces 39 which come to rest against the flattened surfaces 32, the second spring holders 28 are also secured against torsion relative to the tension rod 7 as well as against torsion relative to each other.

The cross section through the contact-making element 19 shown in FIG. 8 illustrates that the contact-making member 19 also has a through-opening 42 with two parallel surfaces 43 for resting against the flattened surfaces 32 on the narrower forward section 31 of the tension rod 7. In this manner, the contact-making element 19 is also secured against torsion relative to the tension rod 7. To ensure a torsion-proof connection to the first spring holder 27, the annular flange 22 of the contact-making element 19 has a through-opening 44 for the locking member 36 shown in FIG. 10. Disposed on the outside surface of the annular flange 22 of the contact-making element 19 are four indentations 45 for the supply of blown air which, in the circumferential direction, are offset by 90° with respect to one another.

Figure 9:
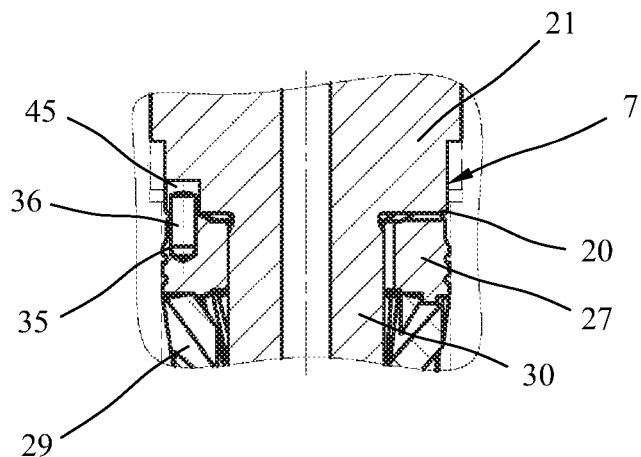
FIG. 9 a sectional view along line N-N of FIG. 5.

FIG. 9 shows the first spring holder 27 of the rearward spring unit 18, said rearward spring unit being disposed on the cylindrical middle section 30 of the tension rod 7 and said first spring holder resting against the collar 20 of the tension rod 7. The pin-shaped locking member 36 disposed in the bore 35 engages in a stop face 46 on the collar 20 of the tension rod 7. In this manner, the first spring holder 27 of the rearward spring unit 18 resting against the collar 20 of the tension rod 7 is secured against torsion relative to the tension rod 7.

Figure 10:
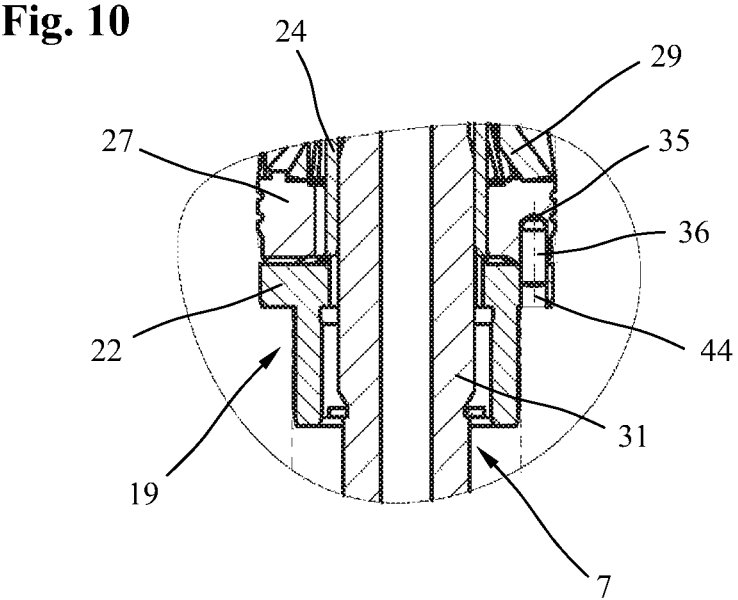
FIG. 10 a sectional view along line O-O of FIG. 8.

FIG. 10 shows the first spring holder 27 of the forward spring unit 18, said forward spring unit being disposed on the sleeve-shaped contact-making section 24 and said first spring holder resting against the contact-making member 19 and being rotated relative to the first spring holder 27 of FIG. 9 by 180° about its longitudinal axis. In this case, the pin-shaped locking member 36 disposed in the bore 35 engages in the through-opening 44 in the annular flange 22 of the contact-making member 19. In this manner, the first spring holder 27 of the forward spring unit 18, said first spring holder resting against the annular flange 22 of the contact-making member 19, is also secured against torsion relative to the tension rod 7.

Figure 11:
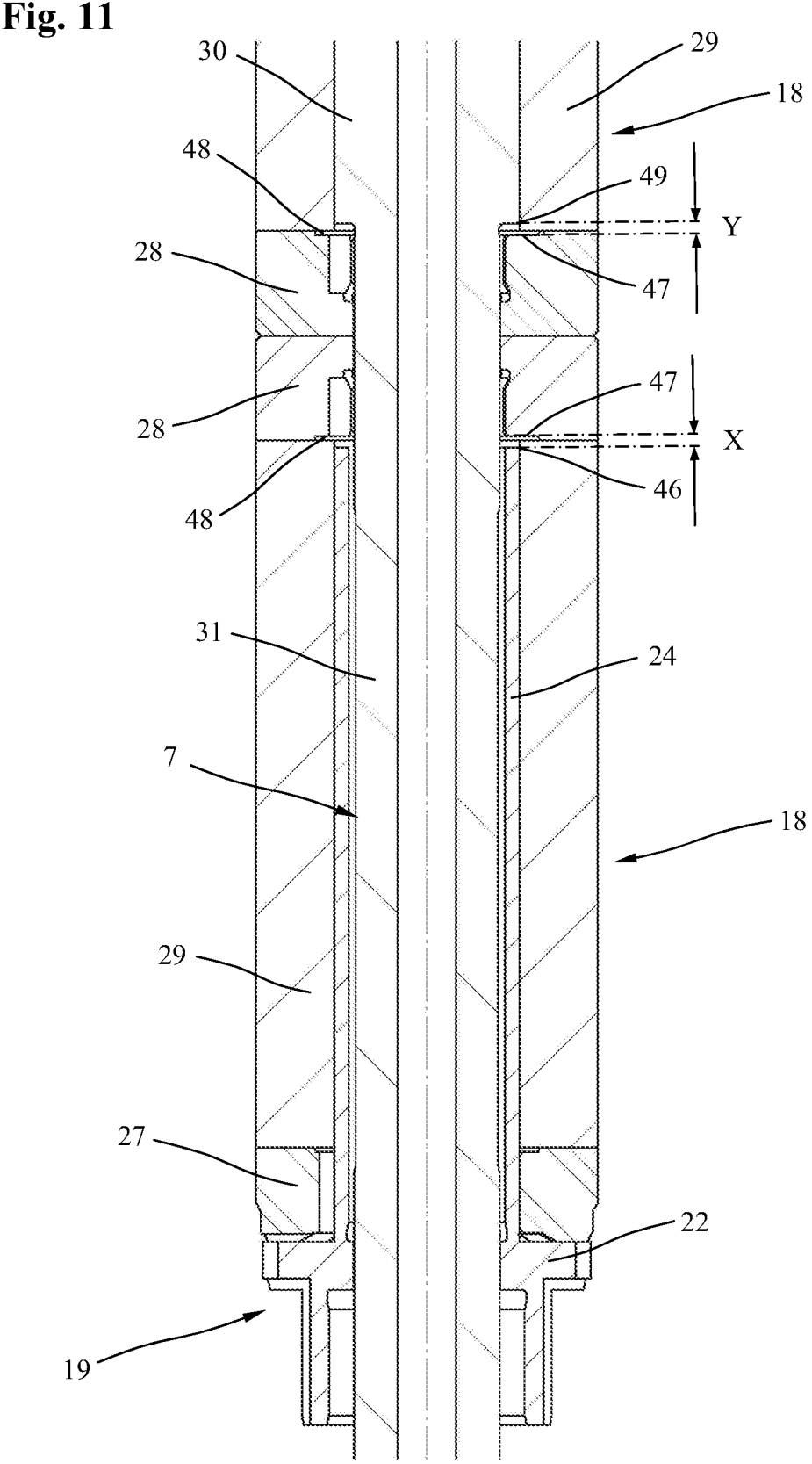
FIG. 11 a detail view of the tension rod with the spring units.

FIG. 11 provides a detail view of the tension rod 7 in a released position with uniformly compressed spring units 18. This diagram shows that the length of the sleeve-shaped contact-making section 24 of the contact-making member 19 supported by the machine component 2 is such that in the released position of the tension rod 7 and at an ideally uniform compression of the two spring units 18, a small safety clearance X is maintained between a stop face 46 on the free end of the sleeve-shaped contact-making section 24 and a stop face 47 on a recess 48 of the second annular spring holder 28 of the forward spring unit 18. The length of the cylindrical middle section 30 of the tension rod 7 is also such that in the released position of the tension rod 7 and at an ideally uniform compression of the two spring units 18, small safety clearance Y is maintained between the stop face 47 on the recess 48 of the second annular spring holder 28 of the rearward spring unit 18 and an annular stop face 49 at the transition from the cylindrical middle section 30 to the narrower forward section 31 of the tension rod 7. In this manner, it is possible to limit the spring deviation or the axial spring deflection of an individual spring unit 18, thereby ensuring that during a compression of the spring units 18 caused by the movement of the tension rod 7 into the released position, that not only one of the spring units 18 is compressed.

The functionality of the clamping device described above will be explained below with reference to FIG. 1.

In the released position of the clamping device shown in FIG. 1, the tension rod 7 is pushed by means of, e.g., the hydraulically, pneumatically or electrically operated releasing unit 25 against the force of the spring assembly 17 into the direction of the toolholder 3. This causes the two spring units 18 to be compressed as indicated in FIG. 3, and the pincer members 12 of the clamping assembly 11, owing to the clamp cone 10 and the supporting sleeve 16, can occupy the radially inwardly pushed released position shown in FIG. 1. In this released position, the outer ends 13 of the pincer members 12 are not engaged in the annular groove 14 in the toolholder 3, and the pincer members 12 disengage the toolholder 3 to allow the tool to be changed.

In contrast, when the pressure sleeve 26 of the releasing unit 25 is retracted, the tension rod 7 is drawn in by the spring assembly 17, which causes the pincer members 12 to be pushed radially outwardly by the clamping cone 10 and the machine taper 5 of the toolholder 3 to be pulled and clamped into the inside taper 4 of the machine component 2 by the pincer members 12.

The clamping device according to the present disclosure is not limited to the embodiment examples described above. Thus, the clamping system according to the present disclosure can be used not only in hollow cone clamping systems but also in steep taper clamping systems of other clamping system. The clamping assembly can be configured both for holding tools with a hollow taper shank (HSK) and for holding tools with a steep taper shank (SK) similar to a collet, as a clamping assembly for polygon shank clamping systems (PSC), as a clamping assembly with spherical clamping members or as a clamping assembly for other tool changing systems. The clamping device is also suitable for releasably holding workpieces. In addition, different types of drive mechanisms can be used to operate the releasing unit.

LIST OF REFERENCE CHARACTERS

1 Clamping device
2 Machine component
3 Toolholder
4 Inside taper
5 Machine taper
6 Through-passage
7 Tension rod
8 Through-bore
9 Forward end of the tension rod
10 Clamping cone
11 Clamping assembly
12 Pincer members
13 Outer ends of the pincer members
14 Annular groove
15 Inner ends of the pincer members
16 Supporting sleeve
17 Spring assembly
18 Spring unit
19 Contact-making member
20 Collar 21 Rearward end of the tension rod
22 Annular flange
23 Annular ledge
24 Sleeve-shaped contact-making section
25 Releasing unit
26 Pressure sleeve
27 First spring holder
28 Second spring holder
29 Spring member
30 Cylindrical middle section of the tension rod
31 Narrower forward section of the tension rod
32 Flattened surfaces
33 Through-passage
34 Grooves
35 Bore
36 Locking member
37 Passage with a circular cross section
38 Passage with two parallel surfaces
39 Surfaces
40 Grooves
41 Grooves
42 Passage
43 Surfaces
44 Through-passage
45 Indentations
46 Stop face
47 Stop face
48 Recess
49 Stop face

What is claimed is:

1. A clamping device for clamping a workpiece or a tool or a toolholder to a machine component of a machine tool, comprising an axially movable tension rod, a clamping assembly which is movable by the tension rod between a clamped position and a released position, a spring assembly dedicated to the tension rod for generating clamping and draw-in force of the clamping assembly, and a releasing unit by which the clamping assembly is movable by the tension rod against the force of the spring assembly into the released position, wherein the spring assembly comprises at least one spring unit with a plurality of flexible spring members disposed between a first and a second spring holder, said first and second spring holders being secured against torsion relative to the tension rod.

2. The clamping device of claim 1, wherein the at least one spring unit comprises a plurality of bar-shaped spring members spaced apart in a circumferential direction and with ends being rigidly mounted or hinge-mounted in the first and second spring holders.

3. The clamping device of claim 1, wherein the spring assembly comprises a plurality of series-connected spring units which are secured against torsion relative to one another.

4. The clamping device of claim 1, wherein the first spring holder comprises a locking member for securing the first spring holder against torsion relative to the tension rod.

5. The clamping device of claim 4, wherein the locking member is disposed in a bore on a front side of the first spring holder.

6. The clamping device of claim 1, wherein the second spring holder has an inside contour so as to engage in a matching outside contour of the tension rod in form-fitting fashion.

7. The clamping device of claim 6, wherein the inside contour is formed by a passage with two parallel surfaces, and the matching outside contour of the tension rod is formed by flattened surfaces on a narrower forward section of the tension rod.

8. The clamping device of claim 1, wherein during compression of the at least one spring unit, axial displacement of at least one spring holder relative to the tension rod is limited by a stop.

9. The clamping device of claim 8, wherein the stop is formed by a stop face of a sleeve-shaped contact-making section on a contact-making member disposed on the tension rod so as to be secured against torsion and/or by a stop face on a middle section of the tension rod.

10. The clamping device of claim 9, wherein the spring assembly comprises a forward spring unit disposed on the sleeve-shaped contact-making section of the contact-making member and a rearward spring unit disposed on the middle section of the tension rod.

11. The clamping device of claim 9, wherein the spring assembly is disposed between a collar on a wider rearward end of the tension rod and the contact-making member disposed on a narrower forward section of the tension rod.

12. The clamping device of claim 1, wherein the releasing unit is operatable hydraulically, pneumatically or electrically.

13. A machining unit of a machine tool having the clamping device of claim 1, wherein the clamping device is integrated into a machine component.

14. The machining unit of claim 13, wherein the machine component is a pivotably mounted work spindle which is rotationally driven by a drive mechanism.

* * * * *